US010924513B1

(12) United States Patent
Sokolov et al.

(10) Patent No.: US 10,924,513 B1
(45) Date of Patent: Feb. 16, 2021

(54) ACTION DETECTION AND NETWORK SECURITY POLICY ENFORCEMENT BASED ON WIRELESS-TRANSMISSION INTERFERENCE PATTERNS

(71) Applicant: NortonLifeLock Inc., Tempe, AZ (US)

(72) Inventors: Ilya Sokolov, Boston, MA (US); Keith Newstadt, West Newton, MA (US)

(73) Assignee: NORTONLIFELOCK INC., Tempe, AZ (US)

( * ) Notice: Subject to any disclaimer, the term of this patent is extended or adjusted under 35 U.S.C. 154(b) by 305 days.

(21) Appl. No.: 15/941,319

(22) Filed: Mar. 30, 2018

(51) Int. Cl.
*H04L 29/08* (2006.01)
*H04L 29/06* (2006.01)
*G06N 20/00* (2019.01)
*H04W 80/04* (2009.01)

(52) U.S. Cl.
CPC ............. *H04L 63/20* (2013.01); *G06N 20/00* (2019.01); *H04L 63/0245* (2013.01); *H04W 80/04* (2013.01)

(58) Field of Classification Search
CPC ..... H04L 63/20; H04L 63/0245; G06N 20/00; H04W 80/04
See application file for complete search history.

(56) References Cited

U.S. PATENT DOCUMENTS

| | | | |
|---|---|---|---|
| 2002/0051464 A1* | 5/2002 | Sin .................... | H04L 47/283 370/466 |
| 2007/0011732 A1* | 1/2007 | Peng .................. | H04L 63/145 726/11 |
| 2011/0280215 A1* | 11/2011 | Nakagawa ............ | H04W 36/14 370/331 |
| 2017/0149743 A1* | 5/2017 | Fukuda ............... | H04L 63/0428 |
| 2017/0196497 A1* | 7/2017 | Ray .................... | A61B 7/04 |
| 2019/0098635 A1* | 3/2019 | Sarwar ............... | H04W 72/082 |

OTHER PUBLICATIONS

Kamran Ali, et al., "Keystroke Recognition Using WiFi Signals," Dept. of Computer Science and Engineering, Michigan State University, <https://www.cse.msu.edu/~alexliu/publications/KamranWiKey/KamranWiKey_MOBICOM15.pdf>, 13 pages.
Mengyuan Li, et al., "When CSI Meets Public WiFi: Inferring Your Mobile Phone Password via WiFi Signals," https://hsec.sjtu.edu.cn/publications/2016/CCS%202016.pdf, Shanghai Jiao Tong University, Oct. 2016, 77 pages.

* cited by examiner

*Primary Examiner* — Alexander Lagor
*Assistant Examiner* — William B Jones
(74) *Attorney, Agent, or Firm* — FisherBroyles, LLP (57) ABSTRACT

Systems of the present disclosure can detect user activities on endpoint devices based on the interference patterns those actions produce in wireless transmissions between those endpoint devices and another device (e.g., an edge device operating as a web security gateway). A web security gateway sends time-series data describing interference on wireless transmissions sent from, or received by, an agentless endpoint device to a network security service. In response, the network security service uses a machine-learning model to infer a type of an action that occurred on the agentless endpoint device concurrently with the wireless transmissions. The network security service sends an indication of the action type to the web security gateway. The web security gateway applies a network security policy to the action or a network communication associated therewith.

20 Claims, 4 Drawing Sheets

ACTION DETECTION AND NETWORK SECURITY POLICY ENFORCEMENT BASED ON WIRELESS-TRANSMISSION INTERFERENCE PATTERNS

BACKGROUND

Field

Embodiments of the present invention generally relate to network security systems and web security gateways. Specifically, embodiments described herein provide systems for detecting actions on agentless endpoint devices and enforcing network security policies.

Description of the Related Art

A web security gateway (a.k.a., a secure Web gateway) can be used to monitor traffic that enters or leaves a private network, such as an enterprise network or a local area network (LAN). A web security gateway can detect certain types of malicious traffic and prevent the malicious traffic from entering or leaving the private network. Organizations often use web security gateways to secure private networks against Internet-based security threats. A web security gateway can be through a combination of hardware (e.g., an edge device, such as a router) and software executing thereon. Web security gateways may offer different types of protection, such as uniform resource locator (URL) filtering, virus detection, and data exfiltration prevention.

Secure Sockets Layer (SSL) is a technology for establishing encrypted links between web servers and browsers. In recent years, many web sites and online services have adopted SSL for encrypting network communications. This link ensures that all data passed between the web server and browsers remain private and integral. SSL is an industry standard and is used by millions of websites in the protection of their online transactions with their customers. Endpoint devices in a network can be configured to trust a self-signed certificate from a web security gateway to allow the web security to decrypt and scan SSL traffic.

SUMMARY

One embodiment disclosed herein includes a method for a network security service to assist a web security gateway to enforce a network security policy. At least a portion of the method is performed by a computing device comprising at least one processor. The method generally includes receiving, via a computing network from the web security gateway, time-series data describing interference patterns in a series of wireless transmissions sent between a first device and a second device, wherein the wireless transmissions occurred at least partially concurrently with an action performed upon a user interface at the first device; generating a set of features based on the time-series data; determining, via a machine-learning model based on the set of features, an action type of the action; and sending an indication of the action type via the network to the web security gateway to allow the web security gateway to determine whether to block a network communication associated with the action based on the network security policy.

One embodiment disclosed herein includes a method for a web security gateway to enforce a network security policy. At least a portion of the method is performed by a computing device comprising at least one processor. The method generally includes collecting, at the web security gateway, time-series data describing interference patterns in a series of wireless transmissions sent between the web security gateway and an endpoint device, wherein the wireless transmissions occurred at least partially concurrently with an action performed upon a user interface at the endpoint device; sending the time-series data to a remotely executed network security service via a network; receiving, from the remotely executed network security service in response to the sending, an action type of the action; comparing the action type to the network security policy; and blocking a network communication associated with the action based on the comparison.

Still another embodiment includes a system including one or more processors and memory storing one or more instructions that, when executed on the one or more processors, perform an operation. The operation generally includes receiving, via a computing network from the web security gateway, time-series data describing interference patterns in a series of wireless transmissions sent between a first device and a second device, wherein the wireless transmissions occurred at least partially concurrently with an action performed upon a user interface at the first device; generating a set of features based on the time-series data; determining, via a machine-learning model based on the set of features, an action type of the action; and sending an indication of the action type via the network to the web security gateway to allow the web security gateway to determine whether to block a network communication associated with the action based on the network security policy.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

While web security gateways provide some protection from malicious network traffic, there are certain types of network security issues that are difficult for a web security gateway to address—particularly for private networks that may be accessed by unmanaged devices. For example, a web security gateway generally cannot decrypt and inspect network traffic for a particular endpoint device unless that endpoint device is configured to trust the web security gateway's self-signed certificate. In private networks with large numbers of endpoint devices or in private networks that grant network access to unmanaged devices, it may be impractical to configure each device properly. As a result, the SSL encryption that protects the user privacy may also defeat an administrator's ability to secure the private network or protect the user from malware.

To address this issue, one approach is to train a machine-learning model to recognize SSL patterns that indicate risky user behaviors. However, the types of behaviors that can be detected have been limited, the process of training the machine-learning model have proven costly, and small changes to sites or services may necessitate retraining the machine-learning model.

Some types of risky user activities are also difficult to detect regardless of whether SSL is used. For example, existing web security gateways may not be able to detect whether a child is making an online purchase, whether a user is downloading a harmless image instead of a potentially harmful executable, or whether a user is posting a harmless photo instead of posting potentially sensitive corporate information. These activities may take place across multiple connections, sometimes concurrently (within a web page) or in series (across a flow of multiple web pages). Also, a specific connection facilitating the objectionable activity (the purchase, download, upload, form submission, etc.) may seem benign. These types of activities are particularly difficult to detect.

Systems of the present disclosure can detect user activities on endpoint devices based on the interference patterns those actions produce in wireless transmissions between those endpoint devices and another device (e.g., an edge device operating as a web security gateway). Browser agents installed on endpoint devices monitor user activities and report the timestamped user activities to a web security gateway. Also, file system agents installed on the endpoint devices monitor and report timestamped file system operations to the web security gateway. While the user activities take place, the web security gateway also collects time-series data describing wireless (e.g., WiFi) interference affecting wireless transmissions which are sent from, or received by, the endpoint devices. The web security gateway sends the time-series data, the information reported by the browser agents, and the information reported by the file system agents to a network security service. The network security service uses the time-series data, the information reported by the browser agents, and the information reported by the file system agents to train a machine-learning model to identify what types of user actions are occurring on the devices based on the time-series data.

Once the machine-learning model is trained, the web security gateway can send time-series data describing interference on wireless transmissions sent from, or received by, an agentless endpoint device to the network security service. In response, the network security service uses the machine-learning model to infer a type of an action that occurred on the agentless endpoint device concurrently with the wireless transmissions. The network security service sends an indication of the action type to the web security gateway. The web security gateway can apply a network security policy to the action or a network communication associated therewith.

In this manner, systems of the present disclosure can determine what types of activities are occurring on an endpoint device and apply a network security policy without requiring that a browser agent or a file system agent be installed locally on the endpoint device.

Figure 1:
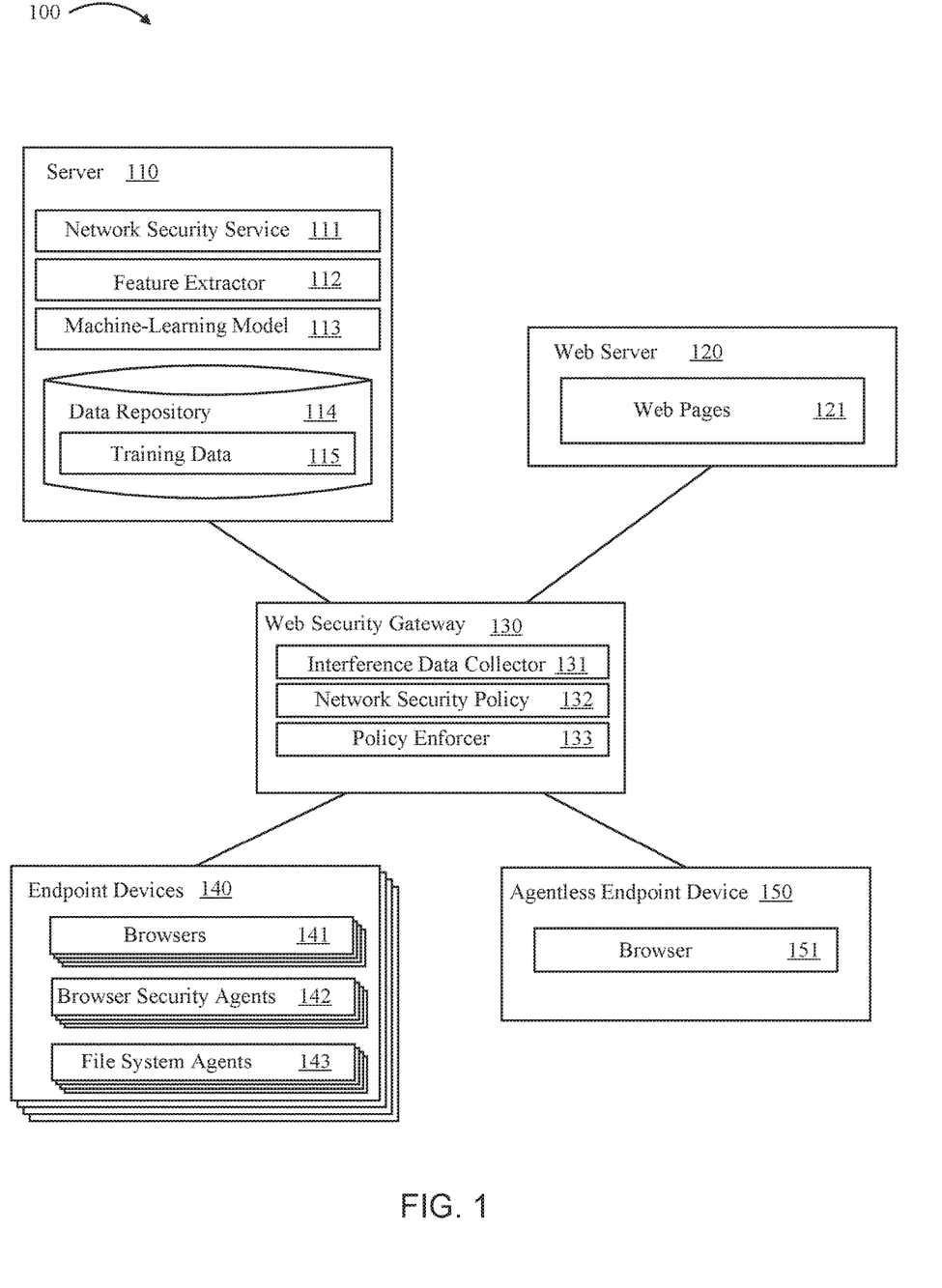
FIG. 1 illustrates a computing environment in which systems of the present disclosure can operate, according to one embodiment.

FIG. 1 illustrates a computing environment 100 in which systems of the present disclosure can operate, according to one embodiment. As shown, the computing environment 100 includes a server 110, a web server 120, a web security gateway 130, one or more endpoint devices 140, and an agentless endpoint device 150. While server 110 and web server 120 are illustrated as single units for simplicity, persons of skill in the art will recognize that modules, functions, or other components attributed to a single server may be distributed across many different servers or hardware resources (e.g., in a cloud computing environment).

The web security gateway 130 (e.g., secure web gateway) represents a device such as a router, a switch, a hub, or some other device through which network communications pass while moving between source locations and destination locations for those communications. A policy enforcer 133 executing at the web security gateway 130 enforces the network security policy 132. In one embodiment, the policy enforcer 133 is a software module.

The network security policy 132 specifies a set of rules for governing network traffic and activity. For example, the network security policy 132 may specify patterns of user actions (e.g., gestures performed by a user while the user provides input through a user interface) that are correlated with malicious effects activities or results. For example, the network security policy 132 may specify that scrolling twice at a particular rate on a touch screen and tapping near the center of a touch screen frequently leads to a purchase flow that should be blocked for some types of users (e.g., children). Examples of a user interface on an endpoint device may include a touch screen, a keyboard (real or virtual), a mouse, a control pad, a stylus, a trackball, and the like. There are many types of actions that, when used individually or in combination, may be used to define user action patterns. Examples of such actions may include scrolling (e.g., sliding a finger on a touch screen or on a scroll wheel of a mouse), zooming in or out (e.g., by placing two fingers on a touch screen and moving the fingers closer together or farther apart), rotating (e.g., by placing two fingers on a touch screen and rotating the fingers around an axis), swiping, dragging, and tapping. Some different action patterns may be distinguished by the speed at which a gesture is performed or the number of fingers used to perform a gesture.

The network security policy 132 may specify that some types of user action patterns (e.g., repeatedly tapping buttons on a numerical keypad on a touch screen four times in quick succession, which may suggest multiple failed attempts to enter a PIN), are globally suspicious and therefore warrant remedial measures (e.g., blocking a network communication initiated as a result of the user action pattern) regardless of context. For other types of user action patterns, the network security policy 132 may be context dependent. For example, the network security policy 132 may specify that some user action patterns are suspicious when performed during sessions with particular website URLs or in association with network communications with particular ranges or URLs.

The network security policy 132 may include, among other things: (1) a blacklist specifying Internet Protocol (IP) addresses, uniform resource locators (URLs), or other network locations known to be malicious and (2) a whitelist specifying trusted network locations.

The policy enforcer 133 may enforce the network security policy 132 while monitoring communications to or from the endpoint devices 140 and the agentless endpoint device 150. For example, when a user navigates to one of the web pages 121 hosted by the web server 120 (e.g., via one of the browsers 141 or the browser 151), the policy enforcer 133 may verify that a URL or an IP address for the web page is not on a blacklist before allowing the navigation to proceed.

At least one of the browsers 141 executes on each of the endpoint devices 140. In addition, at least one of the browser security agents 142 and at least one of the file system agents 143 executes on each of the endpoint devices 140. When users visit the web pages 121 via the browsers 141, the browser security agents 142 may detect and record actions the users perform, such as clicks, scrolls, swipes, taps, etc. For each action detected, the browser security agents 142 may also record a timestamp indicating when the action occurred. In addition, the browser security agents 142 may scan the web pages 121 for keywords and phrases such as "upload," "download," "place order," "purchase completed," "enter social security number," and other words or phrases that suggest potentially sensitive activity. The keywords and phrases may be mapped to activities the keywords and phrases imply, such as file downloads, file uploads, purchases, and other activity categories. Also, the browser security agents 142 may monitor information submitted in web forms to identify sensitive data. For example, the browser security agents 142 may compare data entered in form fields to predefined regular expressions corresponding to social security numbers, credit card numbers, phone numbers, and/or other sensitive data. If the data in a field matches a regular expression corresponding to credit card numbers, the browser security agents 142 may label the data as a credit card number.

The file system agents 143 monitor and log read/write activity on one or more storage media (e.g., local disks) at the endpoint devices 140. The file system agents 143 record a timestamp for each read or write activity. In addition, the file system agents 143 may log metrics on file names, locations, file sizes, file types, hashes, and malware reputations for files associated with the read/write activities.

While the browser security agents 142 and the file system agents 143 log user actions and file activities on the endpoint devices 140, respectively, the interference data collector 131 collects time-series data describing interference patterns in a series of wireless transmissions between the endpoint devices 140 and the web security gateway 130 (or between the endpoint devices 140 and other devices, such as Bluetooth speakers or wireless peripherals such as wireless game controllers, wireless keyboards, and wireless mice). For example, if the endpoint devices 140 communicate with the web security gateway 130 via wireless network connections, the wireless transmissions may comprise Internet Control Message Protocol (ICMP) ping packets. In some embodiments, the ping packets may be sent at a rate of at least 2,500 packets per second, although higher or lower rates may be used.

The time-series data may comprise channel state information (CSI) values of at least one channel on which at least one of the wireless transmissions was transmitted, received signal strength (RSS) values, Doppler shift values, and/or other values that quantify properties of the wireless transmissions. The interference data collector 131 also records timestamps that indicate when the wireless transmissions are sent or received. Depending on the type of wireless transmissions used and the types of values measured, the time-series data may be collected via a hardware component associated with the web security gateway 130 (e.g., such as a network interface controller (NIC)).

The browser security agents 142 and the file system agents 143 report the user actions and the file activities, respectively, to the web security gateway 130.

The browser security agents 142 execute on the endpoint devices 140 and monitor the actions users perform while visiting the web pages 121. For example, if a user operating one of the endpoint devices 140 scrolls down a page displayed in one of the browsers 141 twice within a threshold time period and taps or clicks a button that is labeled with a particular keyword (e.g., "submit"), the browser security agent (which is one of the browser security agents 142) executing on that endpoint device sends a network message to the policy enforcer 133. The message indicates what type of action was performed (e.g., scrolling twice within the threshold time period and clicking on the button labeled with the keyword) and the time(s) at which the action was performed (e.g., by including one or more timestamps).

The policy enforcer 133 compares the action type to the network security policy 132 and determines whether to block a network communication associated with the action based on the comparison. For example, the network security policy 132 may specify that information entered on a form on the page should be blocked if the information is submitted immediately after a user scrolls twice within the threshold time period and clicks a button with the particular keyword. In this example, the policy enforcer 133 would block the information from being sent to the web server 120.

The file system agents 143 execute on the endpoint devices 140 and monitor file system operations performed on the endpoint devices 140. For example, when a file is created, opened, closed, saved, altered, or deleted locally on one of the endpoint devices 140, the file system agent (which is one of the file system agents 143) executing on that endpoint device sends a network message to the policy enforcer 133. The message indicates what type of file system operation was performed and the time at which the file system operation was performed (e.g., by including one or more timestamps). In some embodiments, when the policy enforcer 133 receives a report from one of the browser security agents 142 about an action performed on one of the endpoint devices 140, the policy enforcer 133 can also determine whether a file system agent executing on the same endpoint device has reported any file system operations that occurred concurrently with the action (or within a threshold amount of time before or after the action). If a file system operation did occur concurrently with the action, the policy enforcer 133 can compare both the type of the file system operation and the action type to the network security policy 132 to determine whether to block a network communication associated with the action.

For the endpoint devices 140, the policy enforcer 133 can enforce the network security policy 132 upon network traffic for the endpoint devices 140 in a straightforward manner because the types of actions performed by users on the endpoint devices 140 are directly observed and reported by the browser security agents 142. However, there is no browser security agent available at the agentless endpoint device 150. As a result, the policy enforcer 133 relies on the network security service 111 to infer actions performed by a user at the agentless endpoint device 150 based on time-series data describing interference patterns in a series of wireless transmissions between the agentless endpoint device 150 and the web security gateway 130 (or between the agentless endpoint device 150 and some other device). The network security service 111 trains the machine-learning model 113 to infer action types based on the time-series data in the following manner.

First, the web security gateway 130 sends information collected by the policy enforcer 133 and the interference data collector 131 to the network security service 111. The information includes the actions reported by the browser security agents 142, the file system operations reported by the file system agents 143, and the corresponding timestamps. The information also includes time-series data collected by the interference data collector 131 describing interference patterns in multiple series of wireless transmissions between the endpoint devices 140 and the web security gateway 130 (or between the endpoint devices 140 and other devices).

For each action reported by the browser security agents 142, the network security service 111 identifies corresponding time-series data describing interference patterns in a corresponding series of wireless transmissions sent between the endpoint device on which the action was performed and another device. The wireless transmissions in the corresponding series occurred at least partially concurrently with the physical movements a user made while performing the action (e.g., such as scrolling or tapping a touch screen). As a result, for each action, the physical movements that make up the action influenced the interference patterns described by the corresponding time-series data.

Next, for each action reported by the browser security agents 142, the feature extractor 112 generates a set of corresponding features based on the corresponding time-series data. The features may comprise, for example, channel state information (CSI) values of at least one channel on which at least one of the wireless transmissions was transmitted, maximum peak power, mean amplitude, root mean square deviation of signal amplitude, second/third central moment, rate of change, signal energy, entropy, number of zero crossings, and/or other features.

In some embodiments, for each action reported by the browser security agents 142, the network security service 111 adds an Internet Protocol (IP) address or a media access control (MAC) address to which a network communication associated with the action is directed (or from which the network communication originates) to the corresponding set of features.

Also, in some embodiments, the network security service 111 is also notified of a user identifier associated with each reported action. The user identifier indicates the identity of a user who performed the reported action (e.g., a user who was logged in to one of the web pages 121, as recorded in a cookie at one of browsers 141 executing on the endpoint device on which the action was detected). In these embodiments, the network security service 111 may identify a user profile associated with the user identifier and add a value specified in the user profile to the corresponding set of features.

Next, for each action reported by the browser security agents 142, the network security service 111 creates a corresponding training instance that includes the corresponding set of features and a label indicating the type of the action. The network security service 111 adds the training instances to the training data 115 stored in the data repository 114. One example file format that is used to store training data for machine-learning models is the attribute-relation file format (ARFF), though other formats may be used.

In some embodiments, the network security service 111 uses at least one feature-selection technique on the training data to reduce the number of features per training instance before training the machine-learning model 113. Some feature-selection techniques that can be applied include the Las Vegas Filter (LVF), Las Vegas Incremental (LVI), Relief, Sequential Forward Generation (SFG), Sequential Backward Generation (SBG), Sequential Floating Forward Search (SFFS), Focus, Branch and Bound (B & B), and Quick Branch and Bound (QB&B) techniques.

There are several reasons why it is useful to reduce the number of features included in the training instances of the training data 115 before training the machine-learning model 113. For example, some features extracted by the feature extractor 112 may not be appreciably correlated to the action-type labels that the machine-learning model 113 is meant to infer. Irrelevant features can cause overfitting in some types of machine-learning models. In addition, one feature may be so closely correlated with another feature that it would be redundant to use both for training. Redundant features can blunt the accuracy of some distance metrics used in nearest-neighbor models and should therefore be removed in most cases. Also, if irrelevant or redundant features are present in the training data 115, the machine-learning model 113 may take longer to train.

In general, the number of features included in the each training instance should be small relative to the total number of training instances in the training data 115. In some embodiments, the number of features remaining in each training instance after feature selection can be at least three orders of magnitude smaller than the number of training instances in the training data 115.

Once the training instances in the training data 115 have been generated, the network security service 111 trains the machine-learning model 113 using the training instances. There are many different types of supervised classification models that can be used for the machine-learning model 113. Some examples of supervised classification models include neural networks, naive Bayes models, support vector machines, decision trees (e.g., ID3, CART, C4.5), nearest-neighbor models (e.g., k-NN), and ensemble methods (e.g., random forests, gradient-boosting tree, etc.).

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAID) methods. These methods may use one or more different metrics to determine the order in which attribute values (e.g., input features) are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine-learning models can be combined to form ensemble machine-learning models. An ensemble machine-learning model may be homogenous (i.e., using multiple member models of the same type) or non-homogenous (i.e., using multiple member models of different types). Individual machine-learning models within an ensemble may be trained using overlapping or non-overlapping subsets randomly selected from the training data 115.

Once the machine-learning model 113 has been trained on the training data 115, the network security service 111 is ready to assist the policy enforcer 133 in determining the actions a user performs (e.g., in a user interface displayed via the browser 151) at the agentless endpoint device 150. When a user performs an action at the agentless endpoint device 150, the policy enforcer 133 may detect and intercept a network communication associated with the action. For example, if the user taps a button in the browser 151 to initiate a download, the policy enforcer 133 may intercept a network communication sent from the agentless endpoint device 150 to the web server 120 and/or a network communication sent from the web server 120 that includes the requested download content.

While the agentless endpoint device 150 maintains a network connection (e.g., a wireless connection), the interference data collector 131 collects time-series data describing interference patterns in a series of wireless transmissions between the agentless endpoint devices 150 and the web security gateway 130 (or between the agentless endpoint device 150 and another device, such as a Bluetooth device). The wireless transmissions may comprise Internet Control Message Protocol (ICMP) ping packets. In one embodiment, the interference data collector 131 sets a ping frequency for the ICMP ping packets to at least 2,500 packets per second (e.g., to ensure that interference caused by the action will affect at least a threshold number of transmissions). At least a portion of the time-series data describes interference patterns that occurred while the user performed the action associated with the network communication.

When the policy enforcer 133 detects and intercepts the network communication associated with the action, the policy enforcer 133 retrieves the time-series data from the interference data collector 131. The policy enforcer 133 sends the time-series data to the network security service 111 to request that the network security service 111 identify a type of the action.

In some embodiments, the policy enforcer 133 includes an indication of source address or destination address (e.g., an Internet Protocol (IP) address or a media access control (MAC) address) of the network communication in the request. Also, the policy enforcer 133 may include an indication of a device identifier in the request. The device identifier specifies a device type of the agentless endpoint device 150. Also, the policy enforcer 133 may include a user identifier of the user (e.g., specified in a cookie stored at the agentless endpoint device 150 for the browser 151) in the request.

Upon receiving the request, the network security service 111 sends the time-series data (and the address, the device identifier, and/or the user identifier, if received in the request) to the feature extractor 112. The feature extractor 112 generates a set of features based on the time-series data received in the request. If an address is included in the request, the feature extractor may add an indication of the address to the set of features. Similarly, if a device type is included in the request, the feature extractor may add an indication of the device type to the set of features. Also, if a user identifier is included in the request, the feature extractor 112 may identify a profile for the user and add one or more values specified in the profile to the set of features.

Next, the network security service 111 applies the machine-learning model 113 to the set of features to determine the type of the action performed by the user at the agentless endpoint device 150. In response to receiving the set of features as input, the machine-learning model 113 outputs the action type. The network security service 111 sends an indication of the action type (e.g., via a computing network, such as the Internet) to the policy enforcer 133 in response to the request.

Upon receiving the indication of the action type, the policy enforcer 133 compares the action type to the network security policy 132 to determine whether to block the network communication associated with the action. If the network security policy 132 dictates that network communications associated with the action type should be blocked, the policy enforcer 133 blocks the network communication. Otherwise, the policy enforcer 133 allows the network communication to proceed to its intended network destination.

In this manner, the policy enforcer 133 enforces the network security policy 132 on network communications whose source or destination is the agentless endpoint device 150.

Figure 2:
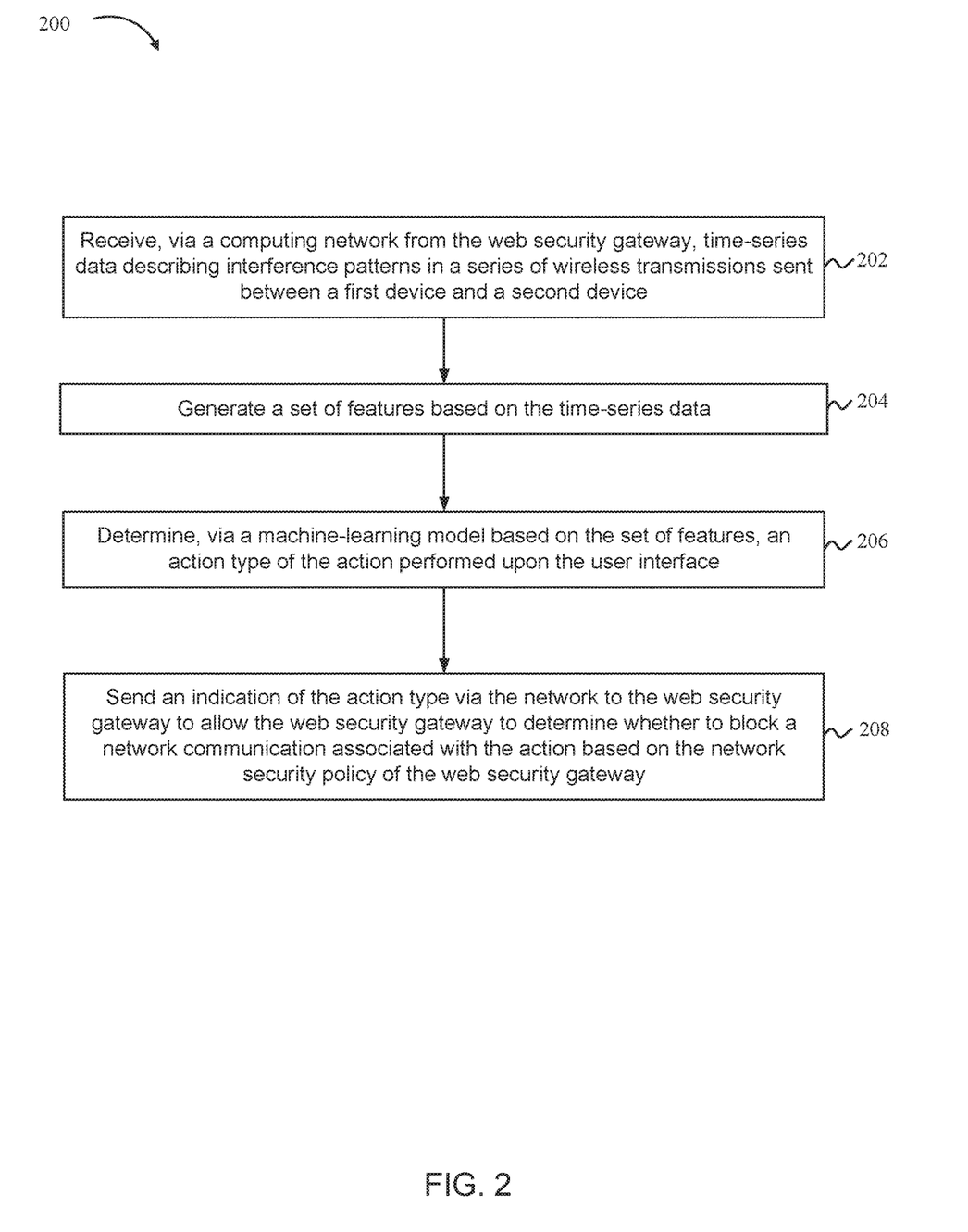
FIG. 2 illustrates a process for a network security service to assist a web security gateway to enforce a network security policy, according to one embodiment.

FIG. 2 illustrates a process 200 for a network security service to assist a web security gateway to enforce a network security policy (of the web security gateway), according to one embodiment. The process 200 can be implemented as a method or the process 200 can be executed as instructions on a machine (e.g., by one or more processors), where the instructions are included on at least one non-transitory computer-readable storage medium.

At block 202, the network security service receives, via a computing network from the web security gateway, time-series data describing interference patterns in a series of wireless transmissions sent between a first device and a second device. The wireless transmissions occurred at least partially concurrently with an action performed upon a user interface at the first device. In one embodiment, the first device is an endpoint device, and the second device is the web security gateway.

The network security service may also receive an address, such as an IP address or a MAC address, associated with the network communication and add the address to the set of features. Also, the network security service may receive a user identifier (e.g., along with the time series data of in a separate message), identify a profile based on the user identifier, and add a value specified in the profile to the set of features.

In one embodiment, the wireless transmissions comprise ICMP ping packets sent between the first device and the second device at a frequency of at least 2,500 packets per second.

At block 204, the network security service generates a set of features based on the time-series data. The features may comprise, for example, channel state information (CSI) values, maximum peak power, mean amplitude, root mean square deviation of signal amplitude, second/third central moment, rate of change, signal energy, entropy, number of zero crossings, and other features for the wireless transmissions.

At block 206, the network security service determines, via a machine-learning model based on the set of features, an action type of the action performed upon the user interface. The action occurred concurrently with at least some of the wireless transmissions.

At block 208, the network security service sends an indication of the action type via the network to the web security gateway to allow the web security gateway to determine whether to block a network communication associated with the action based on the network security policy of the web security gateway.

In one embodiment, the network security service trains the machine-learning model using previously collected data. Specifically, for each additional device in a plurality of additional devices, the network security service receives previous time-series data describing interference patterns in a series of previous wireless transmissions sent between the additional device and another device, wherein the previous wireless transmissions occurred at least partially concurrently with a previous action performed upon a user interface at the additional device; receives activity data collected by a security agent executed at the additional device, wherein the activity data specifies an action type of the previous action and a time at which the previous action was performed; generates an additional set of features based on the previous time-series data; and creates a training instance comprising the additional set of features and a label indicating the action type of the previous action. The network security service trains the machine-learning model based on the training instances.

Figure 3:
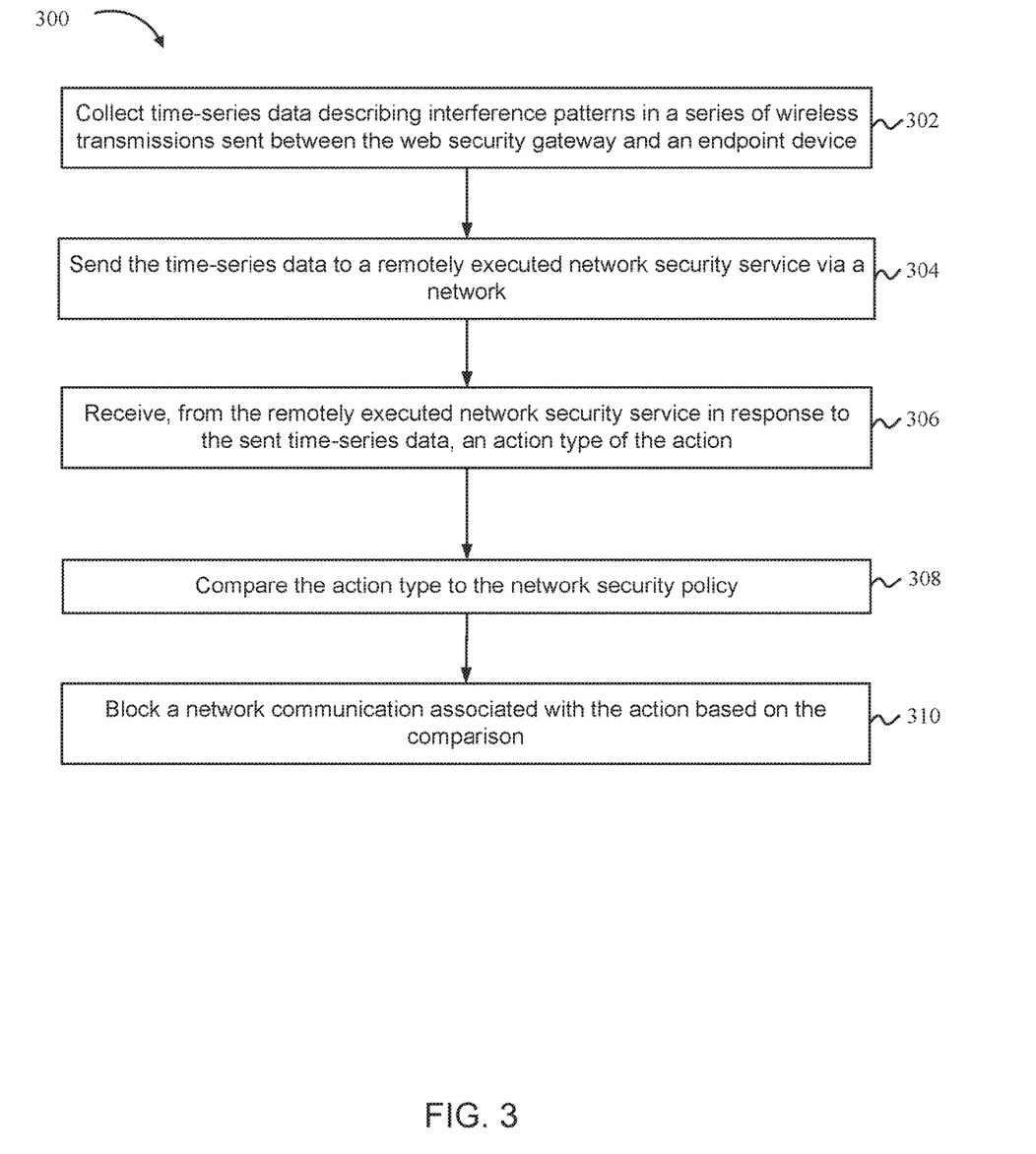
FIG. 3 illustrates a process for a web security gateway to enforce a network security policy, according to one embodiment.

FIG. 3 illustrates a process 300 for a web security gateway to enforce a network security policy, according to one embodiment. The process 300 can be implemented as a method or the process 300 can be executed as instructions on a machine (e.g., by one or more processors), where the instructions are included on at least one non-transitory computer-readable storage medium.

At block 302, the web security gateway collects time-series data describing interference patterns in a series of wireless transmissions sent between the web security gateway and an endpoint device. The wireless transmissions occurred at least partially concurrently with an action performed upon a user interface at the endpoint device. The time-series data may comprise channel state information values of at least one channel for the wireless transmissions. The wireless transmissions comprise Internet Control Message Protocol (ICMP) ping packets sent between the web security gateway and the endpoint device. The web security gateway may set a ping frequency for the ICMP ping packets to at least 2,500 packets per second.

At block 304, the web security gateway sends the time-series data to a remotely executed network security service via a network. In one embodiment, the network security service is operated in a cloud-computing environment.

The web security gateway may also determine a user identifier associated with a current web session at the endpoint device and send an indication of the user identifier to the network security service.

The web security gateway may also identify a device type of the endpoint device and send an indication of the device type to the network security service.

The web security gateway may also identify an Internet Protocol (IP) address to which the network communication associated with the action is directed and send an indication of the IP address to the network security service before receiving the action type.

At block 306, the web security gateway receives, from the remotely executed network security service in response to the sent time-series data, an action type of the action.

At block 308, the web security gateway compares the action type to the network security policy.

At block 310, the web security gateway blocks a network communication associated with the action based on the comparison.

Figure 4:
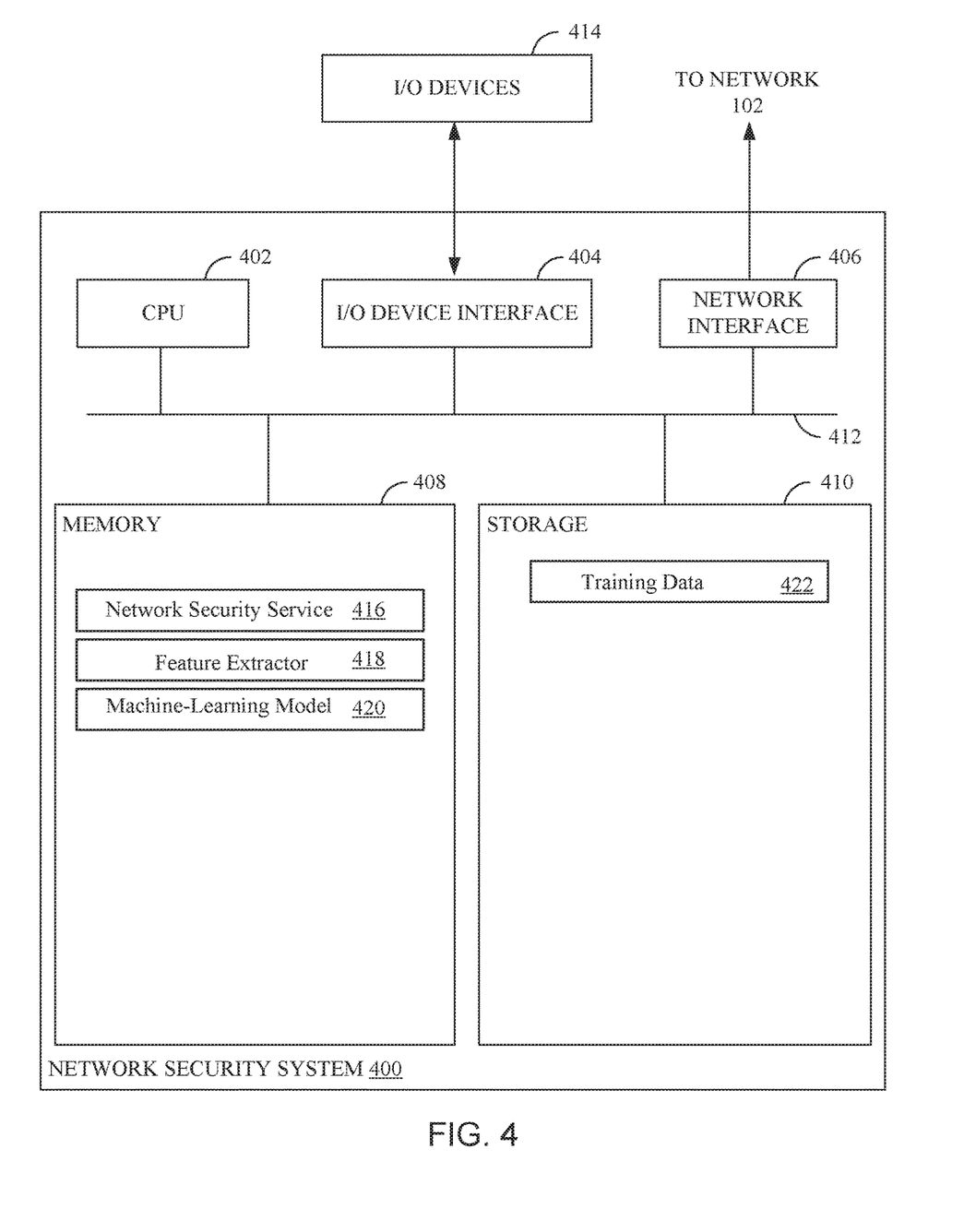
FIG. 4 illustrates a network security system, according to an embodiment.

FIG. 4 illustrates a network security system 400, according to an embodiment. As shown, the network security system 400 includes a central processing unit (CPU) 402, at least one I/O device interface 404 that may allow for the connection of various I/O devices 414 (e.g., keyboards, displays, mouse devices, pen input, speakers, microphones, motion sensors, etc.) to the network security system 400, a network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 can represent a single CPU, multiple CPUs, a single CPU having multiple processing cores, and the like. The memory 408 may represent random access memory (RAM), while the storage 410 may be a disk drive, for example. Although shown as a single unit, the storage 410 may be a combination of fixed or removable storage devices, such as fixed disc drives, removable memory cards or optical storage, network attached storage (NAS), or a storage area-network (SAN).

As shown, memory 408 includes a network security service 416, a feature extractor 418, and a machine-learning model 420. Storage 410 includes training data 422.

To generate the training data 422, the network security service 416 first receives time-series data describing interference patterns in multiple series of wireless transmissions between devices. Each series of wireless transmissions used for generating the training data was sent between a respective endpoint device on which a browser security agent (and, optionally, a file security agent) is installed and another device (e.g., a router comprising a web security gateway). In addition, each series of wireless transmissions occurred at least partially concurrently with an action performed upon a user interface at the respective endpoint device. As a result, the interference patterns manifested in each series of transmissions from a respective endpoint device are influenced by physical motions of a user who performed the action that was concurrent with the series of transmissions. The action is reported by the browser security agent on the respective endpoint device. For each series of wireless transmissions, the network security service 416 may also receive an IP address, MAC address, uniform resource locator (URL), and/or user identifier associated with the respective concurrent action or with a network communication initiated by the respective concurrent action.

Next, for each series of wireless transmissions, the network security service 416 uses the feature extractor 418 to generate a corresponding set of features based on the time-series data. Optionally, indicia of an IP address, a MAC address, a URL, and/or values from a profile associated with a user identifier may be added to the corresponding set of features. The set of features is paired with a label indicating the type of the action that occurred concurrently with the series of wireless transmissions to form a training instance that is stored in the training data 422. Once the training instances have been generated and added to the training data 422, the network security service 416 trains the machine-learning model 420 on the training data.

Once the machine-learning model 420 is trained, the network security service 416 can receive a request (e.g., via the network interface 406) to identify a type of an action that occurred on an agentless endpoint device. The request includes time-series data describing interference patterns in a series of wireless transmissions sent between the agentless endpoint device and another device. At least some of the wireless transmissions in the series occurred concurrently with the action.

In response, the network security service 416 generates a set of features based on the time-series data via the feature extractor 418. If the request specifies additional information (e.g., an IP address a MAC address, a URL, and/or user identifier), the network security service 416 may add additional features to the set based on the additional information. The network security service 416 provides the set of features as input to the machine-learning model 420. In response, the machine-learning model 420 outputs a type of the action that is inferred based on the features. The network security service 416 sends an indication of the type via the network interface 406 in response to the request.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A non-transitory computer-readable medium storing computer-executable instructions that, when executed by a physical processor of at least one computing device, cause the computing device to perform a method for a network security service to assist a web security gateway to enforce a network security policy, the method comprising:
   collecting, at the web security gateway, time-series data describing interference patterns in a series of wireless transmissions sent between the web security gateway and an endpoint device, wherein the wireless transmissions occurred at least partially concurrently with an action performed upon a user interface at the endpoint device and the time-series data comprises at least one of channel state information (CSI) values, received signal strength (RSS) values, or Doppler shift values;
   sending the time-series data to a remotely executed network security service via a network;
   receiving, from the remotely executed network security service in response to the sending, an action type of the action, the action type indicating at least one of a scrolling action, a pressing action, and a clicking action;
   comparing the action type to the network security policy; and
   blocking a network communication associated with the action based on the comparison.

2. The medium of claim 1, wherein the method further comprises:
   identifying an Internet Protocol (IP) address to which the network communication associated with the action is directed; and
   sending an indication of the IP address to the network security service before receiving the action type.

3. The medium of claim 1, wherein the method further comprises:
   identifying a device type of the endpoint device; and
   sending an indication of the device type to the network security service before receiving the action type.

4. The medium of claim 1, wherein the time-series data comprises the channel state information values of at least one channel for the wireless transmissions.

5. The medium of claim 1, wherein the wireless transmissions comprise Internet Control Message Protocol (ICMP) ping packets sent between the web security gateway and the endpoint device.

6. The medium of claim 5, wherein the method further comprises setting a ping frequency for the ICMP ping packets to at least 2,500 packets per second.

7. The medium of claim 1, wherein the method further comprises:
   determining a user identifier associated with a current web session at the endpoint device; and sending an indication of the user identifier to the network security service before receiving the action type.

8. A method for a web security gateway to enforce a network security policy, the method comprising:
collecting, at the web security gateway, time-series data describing interference patterns in a series of wireless transmissions sent between the web security gateway and an endpoint device, wherein the wireless transmissions occurred at least partially concurrently with an action performed upon a user interface at the endpoint device and the time-series data comprises at least one of channel state information (CSI) values, received signal strength (RSS) values, or Doppler shift values;
sending the time-series data to a remotely executed network security service via a network;
receiving, from the remotely executed network security service in response to the sending, an action type of the action, the action type indicating at least one of a scrolling action, a pressing action, and a clicking action;
comparing the action type to the network security policy; and
blocking a network communication associated with the action based at least in part on the comparison.

9. The method of claim 8, further comprising:
identifying an Internet Protocol (IP) address to which the network communication associated with the action is directed; and
sending an indication of the IP address to the network security service before receiving the action type.

10. The method of claim 8, further comprising:
identifying a device type of the endpoint device; and
sending an indication of the device type to the network security service before receiving the action type.

11. The method of claim 8, wherein the time-series data comprises the channel state information values of at least one channel for the wireless transmissions.

12. The method of claim 8, wherein the wireless transmissions comprise Internet Control Message Protocol (ICMP) ping packets sent between the web security gateway and the endpoint device.

13. The method of claim 12, further comprising:
setting a ping frequency for the ICMP ping packets to at least 2,500 packets per second.

14. The method of claim 8, further comprising:
determining a user identifier associated with a current web session at the endpoint device; and
sending an indication of the user identifier to the network security service before receiving the action type.

15. A system comprising:
one or more processors; and
a non-transitory memory storing one or more instructions that, when executed on the one or more processors, perform an operation, the operation comprising:
collecting, at a web security gateway that enforces a network security policy, time-series data describing interference patterns in a series of wireless transmissions sent between the web security gateway and an endpoint device, wherein the wireless transmissions occurred at least partially concurrently with an action performed upon a user interface at the endpoint device and the time-series data comprises at least one of channel state information (CSI) values, received signal strength (RSS) values, or Doppler shift values;
sending the time-series data to a remotely executed network security service via a network;
receiving, from the remotely executed network security service in response to the sending, an action type of the action, the action type indicating at least one of a scrolling action, a pressing action, and a clicking action;
comparing the action type to the network security policy; and
blocking a network communication associated with the action based at least in part on the comparison.

16. The system of claim 15, wherein the operation further comprises:
identifying an Internet Protocol (IP) address to which the network communication associated with the action is directed; and
sending an indication of the IP address to the network security service before receiving the action type.

17. The system of claim 15, wherein the operation further comprises:
identifying a device type of the endpoint device; and
sending an indication of the device type to the network security service before receiving the action type.

18. The system of claim 15, wherein the time-series data comprises the channel state information values of at least one channel for the wireless transmissions.

19. The system of claim 15, wherein the wireless transmissions comprise Internet Control Message Protocol (ICMP) ping packets sent between the web security gateway and the endpoint device.

20. The system of claim 19, further comprising:
setting a ping frequency for the ICMP ping packets to at least 2,500 packets per second.

* * * * *